Nov. 12, 1968 R. K. WILMER 3,410,451

DOCUMENT RETRIEVAL SYSTEM

Filed June 5, 1963 7 Sheets-Sheet 1

INVENTOR
RICHARD K. WILMER

BY Ronald P. Kananen

AGENT

United States Patent Office 3,410,451

Patented Nov. 12, 1968

3,410,451

DOCUMENT RETRIEVAL SYSTEM

Richard K. Wilmer, Yorktown Heights, N.Y., assignor to International Business Machines Corporation, New York, N.Y., a corporation of New York Filed June 5, 1963, Ser. No. 285,644
15 Claims. (Cl. 221—13)

ABSTRACT OF THE DISCLOSURE

A device for selecting a record from any one of a plurality of storage bins arranged along a common path of travel and delivering it to a utilization station. Each one of a first bin and one or more intermediate bins is capable of vertical and lateral movement so that a selected card can pass through an empty record position in any intermediate bin in a straight line of travel to the utilization station.

This invention relates to document retrieval systems and more particularly to a system for rapidly accessing in any desired order any one of an extremely large number of documents.

An increasingly serious problem both in government and business is that of storing large numbers of documents and of being able to retrieve a desired document rapidly and at low cost. One method of achieving this large volume storage is to reproduce microimages of the documents on thin record members, such as photographic film strips and then store the record members in addressable bins. With memories of this type, high speed selection and transport of the desired record member to a reading or writing station becomes a problem. This problem is complicated by the small size of the images being handled and by the fact that, where the images are being reproduced on photographic film, physical contact with the recorded-on portions of the film must be avoided.

Two systems for solving this problem are presented in copending applications Ser. Nos. 271,816 and 281,954, now Patent Nos. 3,158,287 and 3,342,371, filed Apr. 9, 1963, and May 20, 1963, respectively, both of which are filed on behalf of R. K. Wilmer are entitled "Document Retrieval System," and are assigned to the assignee of the instant application. The first of these systems stores film strips, each film strip having a plurality of document images (hereafter called documents) stored thereon, in a bin, which bin may be moved in two dimensions to position the film strip containing a desired document between an ejector mechanism and a transport path. The transport path leads to an optical reading station where the desired document is read. The film strip is then returned along the transport path to the slot in the storage bin from which it was ejected or along an alternate transport path to a corresponding slot in another storage bin.

The system described above is adequate when a limited number of documents are being stored. However, when an extremely large number of documents are being stored, the storage bin in the above system becomes quite large. The existence of an extremely large storage bin is undesirable for two reasons. First, a large bin is heavy and the heavier the bin, the greater the inertia which the bin positioning mechanism must overcome. Larger, stronger, and more complicated bin driver mechanisms are therefore required. Secondly, as the size of the bin increases, the average distance between storage positions also increases. This results in a corresponding increase in the average time to reposition the bin from its existing position to the position where the next desired film strip is located. For the above reasons, and others, the size of a storage bin cannot be increased indefinitely to accommodate an ever increasing number of documents to be stored and some alternative scheme must be provided to solve this problem. To obtain a completely flexible system, the scheme should permit the capacity to be increased without causing any significant alteration in the existing system.

While the system presented in application Ser. No. 281,594 solves many of the problems indicated above, including, to some extent, the capacity increasing problem, the need still exists for a simple and economical method of increasing the capacity of a document storage and retrieval system without causing any significant alteration in the existing system.

It is therefore an object of this invention to provide an improved means for storing a large number of documents and for rapidly retrieving the desired documents in any desired order.

Another object of this invention is to provide a means of the type described above which does not require physical contact to be made with the recorded-on portions of a document storage strip.

A more specific object of this invention is to provide a storage and retrieval system for an extremely large number of documents which does not require the use of excessively large storage bins.

A further object of this invention is to provide a system of the type described above, the capacity of which is completely flexible so that it may be easily expanded to accommodate a larger number of documents without causing any significant alteration of the existing system.

A still further object of this invention is to provide a flexible system of the type described above, the capacity of which may be increased in a simple and economical manner.

In accordance with these objects, this invention provides a first bin and a second bin, each of which bins has a plurality of record-receiving positions. The first bin is positioned between a device for utilizing the records, for example, a record reading station, and the second bin and has an opening formed through at least one of its record-receiving position. Control circuitry is provided which operates in response to a request for a record from the second bin to energize piston adders and pneumatic cylinders to position the bins in such a way that the record receiving position in the second bin containing the requested record is aligned with an opening in the first bin. An ejector is then energized to drive the requested record through the aligned opening in the first bin to the read station.

In one embodiment of the invention, a transport path is provided between the first and second bins, while in the other embodiment of the invention, these two bins are flush against each other. In both embodiments of the invention, some form of transport path is provided between the front-most bin and the read station. When a plurality of documents are stored on a single record, pneumatically controlled stops are provided in the transport path for stopping a selected record with the requested documents at the read station.

When a greater storage capacity than can be provided by the two bins is required, additional bins may be positioned behind the second bin. Each bin except the rearmost has an opening formed through at least one of its record-receiving positions to allow records from the bins behind it to pass through. In the embodiment of the invention having transport paths connecting the bins, there is a transport path between each of the bins.

The foregoing and other objects, features and advantages of the invention will be apparent from the following more particular description of preferred embodiments of the invention as illustrated in the accompanying drawings.

In the drawings:

FIG. 1*a* is a partially exploded perspective view of one embodiment of the storage and transport system of this invention.

FIG. 1*b* is a fully exploded perspective view of the major elements of the embodiment of the invention shown in FIG. 1, in an alternative position.

FIG. 1*c* is a cutaway sectional view taken along the line 1c—1c in FIG. 1*b*.

FIG. 2 indicates the arrangement of FIGS. 2*a*–2*c* to form a block diagram of an electronic control circuit for the system shown in FIGS. 1*a*–1*c*.

FIGS. 2*a*–2*c* when taken together form a block diagram of an electronic control circuit for the system shown in FIGS. 1*a*–1*c*.

Figure 1A:
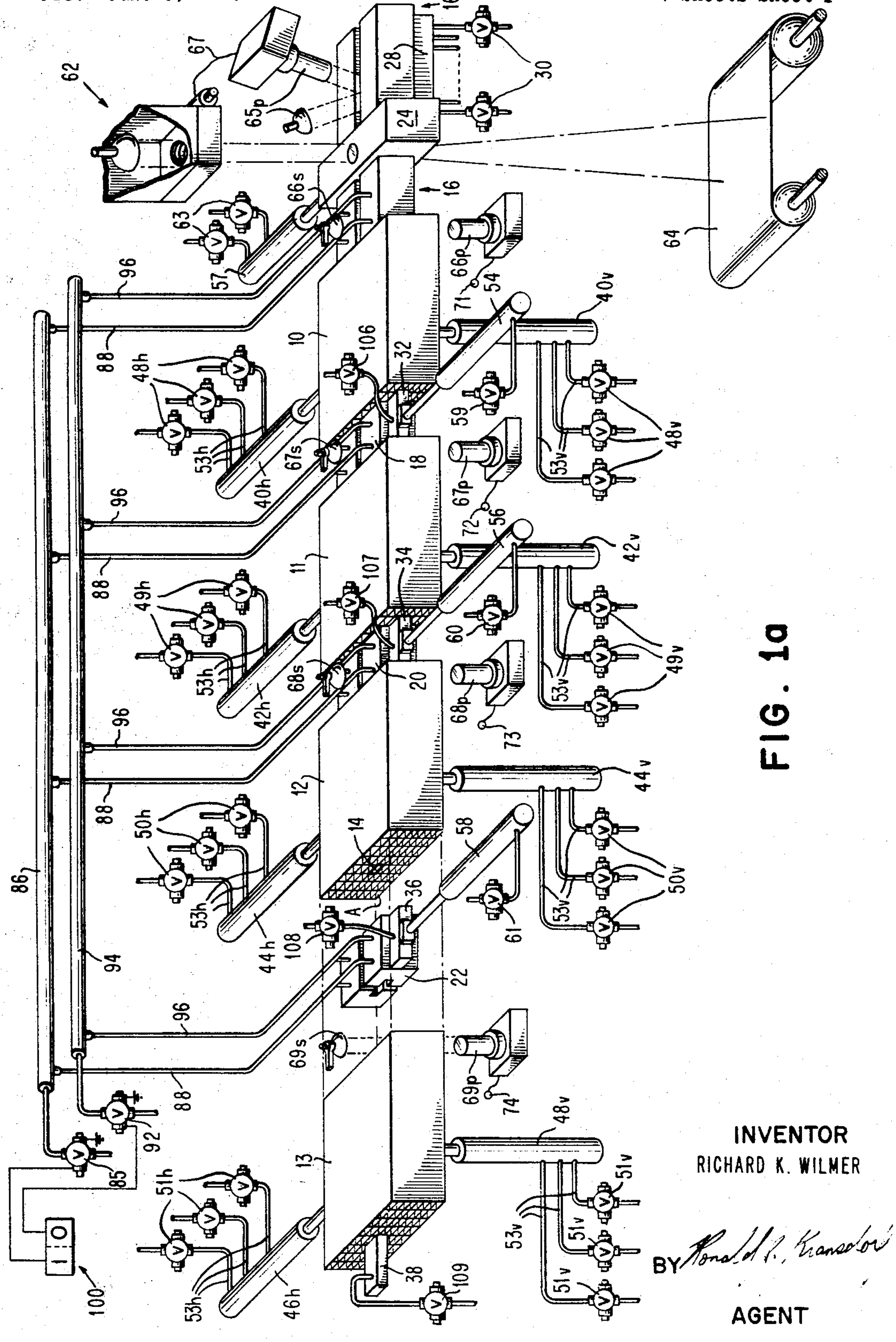
Figure 1B:
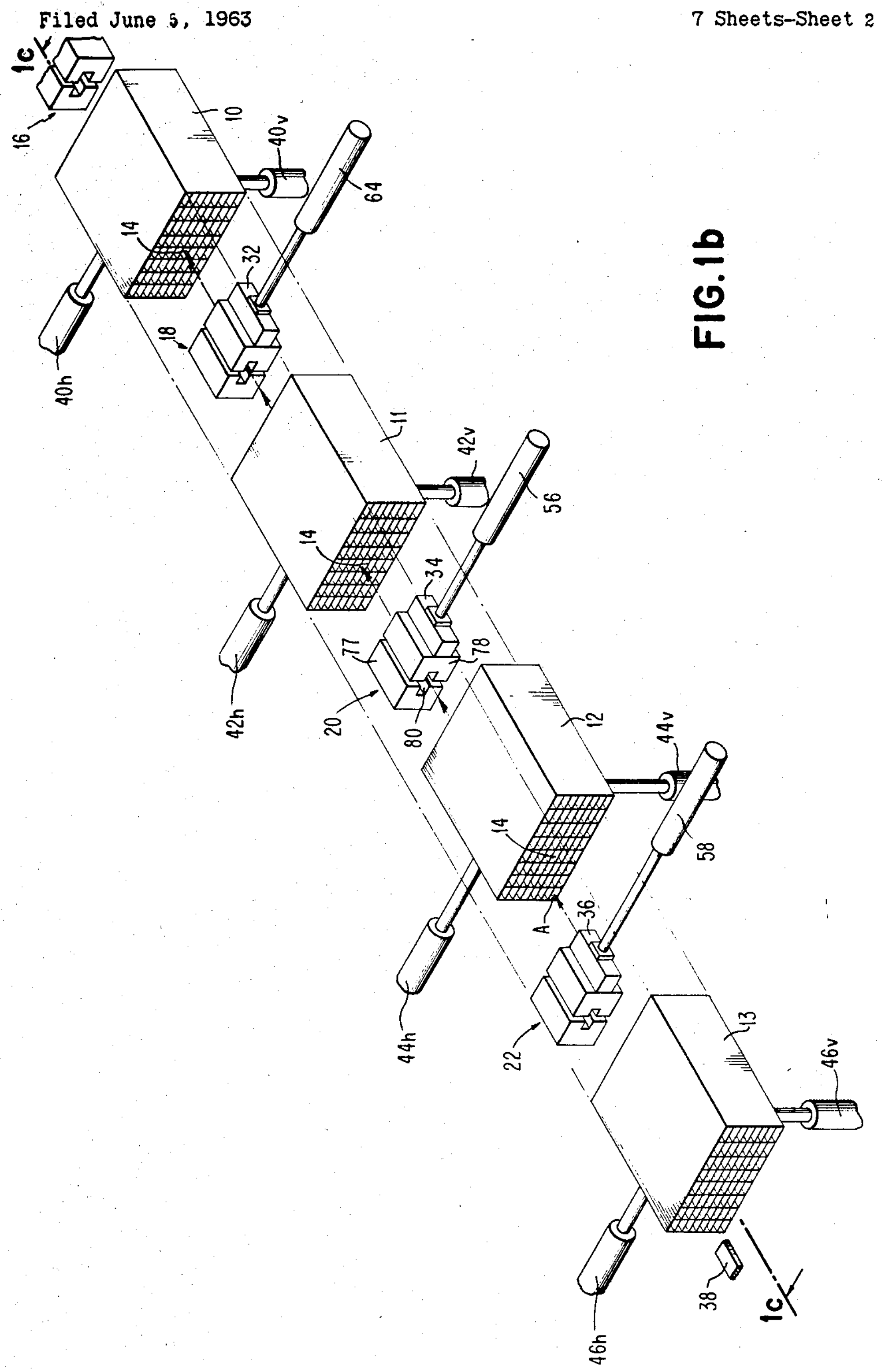
Figure 1C:
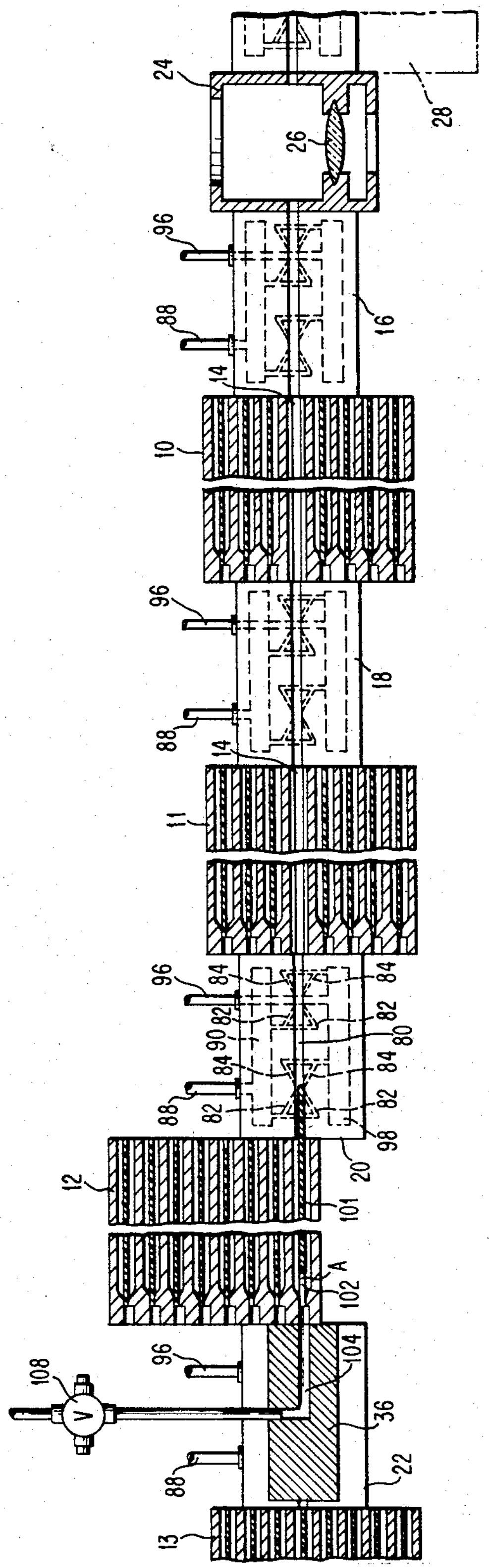

In the embodiment of the invention shown in FIGS. 1*a*–1*c*, four storage bins 10, 11, 12 and 13 are positioned one behind the other. Each bin contains an 8 x 8 matrix array of film receiving positions. One position, 14, in each of the bins 10, 11 and 12 is always left empty so that a film strip may pass through it. Details of the film receiving positions and the empty position 14 are shown in FIG. 1*c* and described later.

Figure 3:
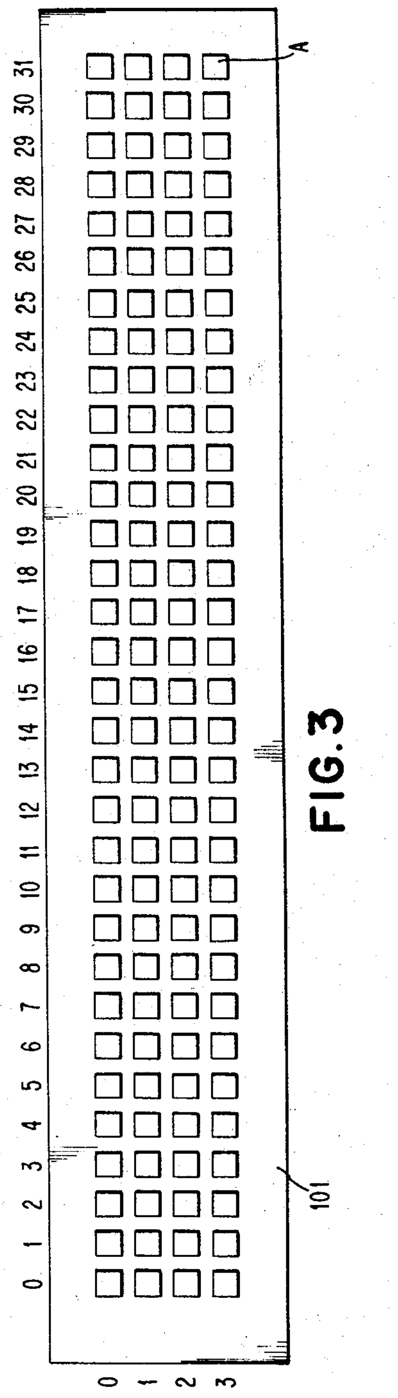
FIG. 3 is a top view of a film strip of the type stored in the bins in FIGS. 1*a*–1*c*.

FIG. 3 shows a film strip which is stored and transported in this system. It is rectangular in shape and has documents stored on it in a matrix arrangement having four columns and 32 rows. Each film strip also has an unrecorded column along each of its longer edges, these columns being of sufficient width to permit transport of the strips in a manner to be described later without causing physical contact wtih recorded-on portions of the strip.

Figure 2C:
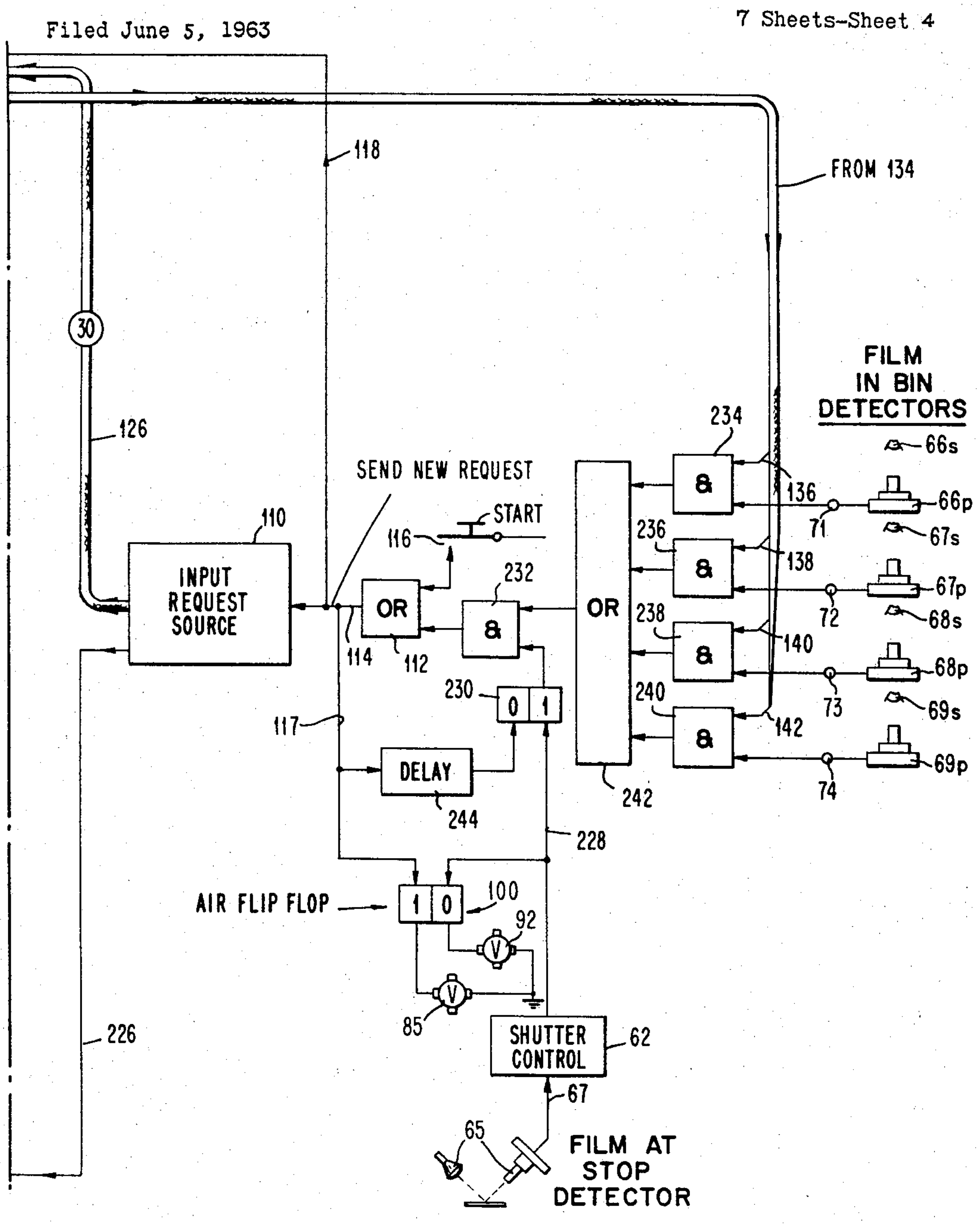
Figure 2:
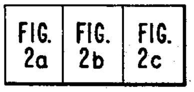

A transport path 16 is positioned in front of bin 10. Short transport paths 18, 20 and 22 are positioned between bins 10 and 11, between bins 11 and 12, and between bins 12 and 13, respectively. The details of these transport paths, which paths are all similar in construction, are shown in FIGS. 1*b* and 1*c* and are described later. The method of supplying air pressure to these paths is shown in FIGS. 1*a* and 2*c* and is likewise described later.

Transport path 16 passes through an optical-read station 24. Referring to FIG. 1*c*, it is seen that this read station has a lens 26 positioned therein. Thirty-two stop members 28 (only the casing for these members is shown in FIG. 1*c*) are positioned adjacent to transport path 16 near its far end. Each stop member 28 has a solenoid operated valve 30 (two shown) which controls it. The details of the stops 28 and their manner of operation is given in the before-mentioned copending application Ser. No. 271,816. For the purposes of this discussion, it is sufficient to think of them as a plurality of flat plates which are normally in a retracted position and which are raised into transport path 16 to stop the progress of a record strip when their associated valves 30 are energized. When a valve 30 is de-energized, the associated stop 28 returns to its retracted position.

Attached to the right of each of the transport paths 18, 20 and 22, is an ejector mechanism 32, 34, and 36, respectively. An ejector 38 is also positioned behind bin 13 in a position in line with transport path 16. These ejectors are of a type shown in copending application Ser. No. 220,453, now Patent No. 3,174,645, filed Aug. 30, 1962, on behalf of H. A. Khoury and C. L. Barcia, entitled, "Ejector Device," and assigned to the assignee of the instant application. Details of this ejector device are shown in FIG. 1*c* for the ejector 36 and are described briefly later.

Piston adders **40*v*, 42*v*, 44*v*, and 46*v* are provided to control the vertical position of the bins 10, 11, 12 and 13, respectively. Similarly, piston adders 40*h*, 42*h*, 44*h*, and 46*h* are provided to control the horizontal position of these bins. These piston adders are of a standard variety which is shown, for example, in FIG. 8 of copending application Ser. No. 217,185, now Patent No. 3,293,414, filed Aug. 15, 1962, on behalf of C. L. Barcia, entitled "Record Transport Device," and assigned to the assignee of the instant application. Both the vertical and the horizontal piston adders are normally biased to a retracted position by air pressure from a low pressure source (not shown) applied to the top of the pistons. Solenoid valves 48*v*–51*v* and 48*h*–51*h* are connected by air lines 53*v* and 53*h* to the vertical piston adders and the horizontal piston adders, respectively. The piston adders 40*v*, 42*v*, 44*v*, 46*v*, 40*h*, 42*h*, 44*h* and 46*h*** each have three piston adders having binary displacement values 1, 2 and 4. By selectively energizing one or more of the valves for a given piston adder, the piston adder may be extended to any one of its seven extended positions. An eighth (home position) is obtained by not energizing any of the valves.

The beforementioned transport paths 18, 20, and 22 are normally positioned in alignment with transport path 16, in which positions film strips may be passed through from other bins. To position an ejector 32, 34, or 36 in alignment with transport path 16 to eject a strip from a bin 10, 11 or 12, respectively, it is necessary to apply air pressure to a pneumatic cylinder 54, 56, or 58, respectively. Air pressure is applied to pneumatic cylinders 54, 56, and 58 under control of solenoid valves 59–61, respectively.

When a film strip is at optical-read station 24, lens 26 is normally positioned over the ZERO column. To position lens 26 over one of the other three columns of the film strip, a piston adder 57 (FIG. 1*a*) is moved to one of its three extended positions by applying air pressure to it through either one or both of the valves 63. The manner of energizing the valves 63 is described later.

Referring specifically to FIG. 1*a*, it is seen that light is applied to optical-read station 24 by shutter-controlled light source 62. The image-containing light beam from optical-read station 24 is applied to output film 64. The shutter of shutter controlled light source 62 is operated by a signal from the photomultiplier tube of photomultiplier-tube-light-source combination 65, via a line 67 which combination acts as a film-strip-at-stop detector.

A light-source 665–695 photocell **66*p*–69*p* combinations are positioned to detect the passage of a film strip into bins 10–13, respectively. Output signals from the photocells 66*p*–69*p* are applied to output terminals 71–74**, respectively.

*Transport path*

FIGS. 1*b* and 1*c* show the details of the transport paths 16, 18, and 20. Details of the transport path 22 are not shown in FIG. 1*c*, but this transport path is identical to the paths 18 and 20. Since the transport paths are all structurally identical, the only difference being that transport path 16 is somewhat longer than the others, the following discussion will be limited to the transport path 20 and it will be understood that it applies to the others as well.

Referring to FIG. 1*b*, it is seen that transport path 20 is made up of two blocks 77 and 78. Each of these blocks has a groove 80 formed in its inner face, the grooves in each of the blocks being opposite to each other. Referring to FIG. 1*c*, it is seen that the upper and lower faces of the grooves 80 have first pairs of nozzles 82 and second pairs of nozzles 84 therein. The nozzles 82 are angled in a direction such that when air pressure is applied to them, they tend to drive a film strip from left to right in transport path 20. Nozzles 84 are angled to drive a film strip from right to left in transport path 20 when air pressure is applied to them.

Referring to FIGS. 1*a* and 1*c* together, it is seen that air pressure is supplied to nozzles 82 through a solenoid control valve 85, air tube 86, air tube 88, and manifold 90. Air pressure is applied to nozzles 84 through solenoid controlled valve 92, air tube 94, air tube 96, and manifold 98. One or the other of the valves 85 or 92 is energized at any given time. A flip-flop 100 controls these solenoid valves in a manner to be described later.

*Record receiving positions*

FIG. 1*c* shows a cross-section of one column of record-receiving positions in each storage bin. With the exception of the empty positions 14 shown for bins 10 and 11, each of the positions is the same as those shown in detail in the beforementioned copending application Ser. No. 220,453. The inside of the receiving position can best be seen from the position A in bin 12 which has a film strip 101 partially removed therefrom. It is seen that each record receiving position is made up of three portions: a short tube-like portion at its rear, a slightly longer restricted portion which has a width and a thickness substantially the same as that of the film strip, and an unrestricted portion having channels 102 formed in its sides. The open position 14 has a width which is substantially the same as that of a record strip and a thickness which is substantially the same as that of the grooves 80.

*Ejector*

FIG. 1*c* shows a cross-section of the ejector 36. The other ejectors 32, 34 and 38 in FIG. 1*a* all have the same cross-section. From FIG. 1*c*, it is seen that the ejector 36 is merely a solid box having an air tube 104 passing through it. Referring to FIG. 1*a*, it is seen that air pressure is applied to the ejector air tubes under control of solenoid valves 106–109. Since a film strip fits very tightly into the restricted portion of its receiving position, it does not allow air to pass around it. Therefore, when air pressure is applied to one of the ejector air tubes, there is a pressure build-up behind the film strip in the receiving position in front of the ejector air tube. This pressure ultimately blasts the film strip out of its receiving position into the transport path. This ejection procedure is described in more detail in the beforementioned copending application Ser. No. 220,453.

*Circuit description*

Figure 2A:
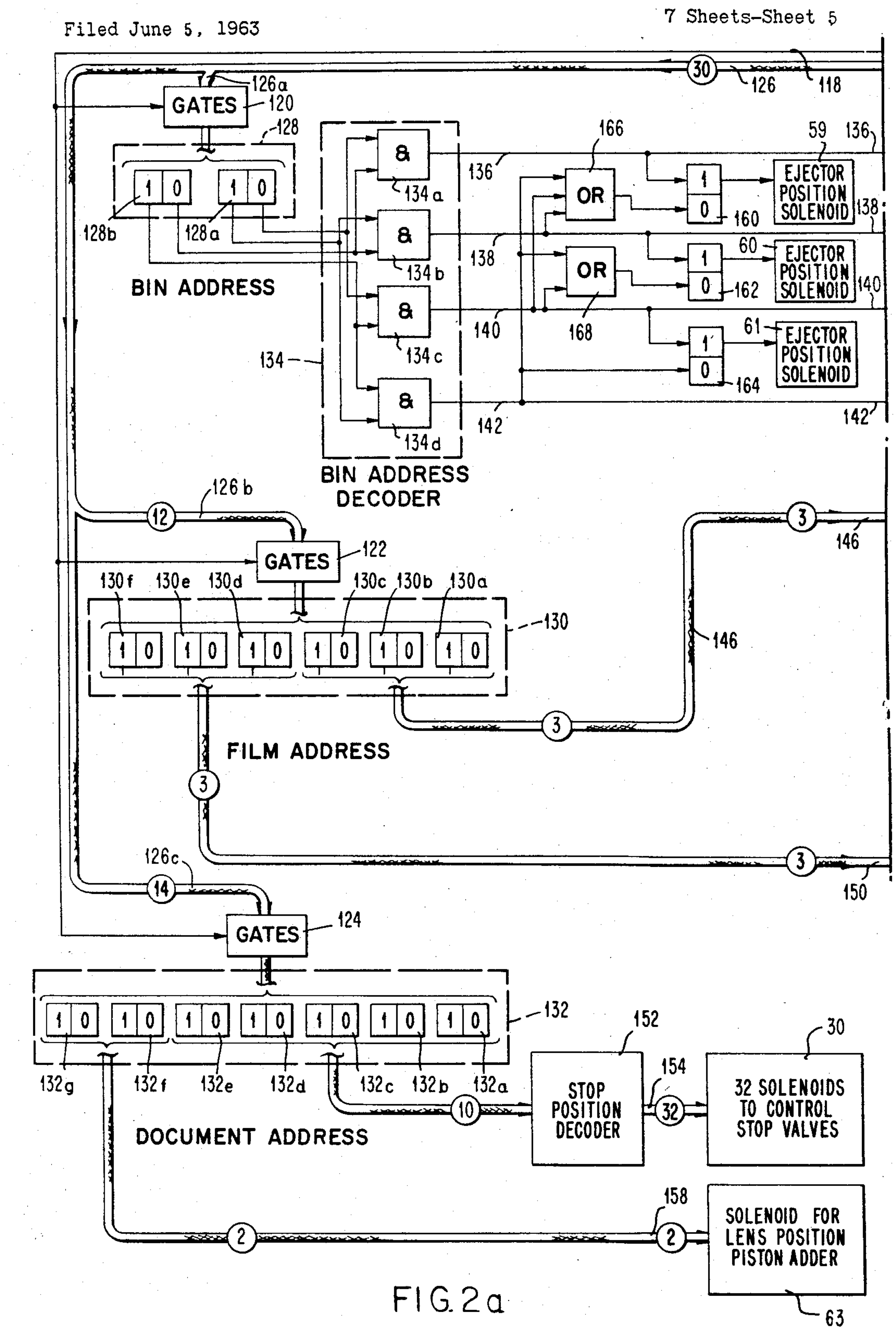
Figure 2B:
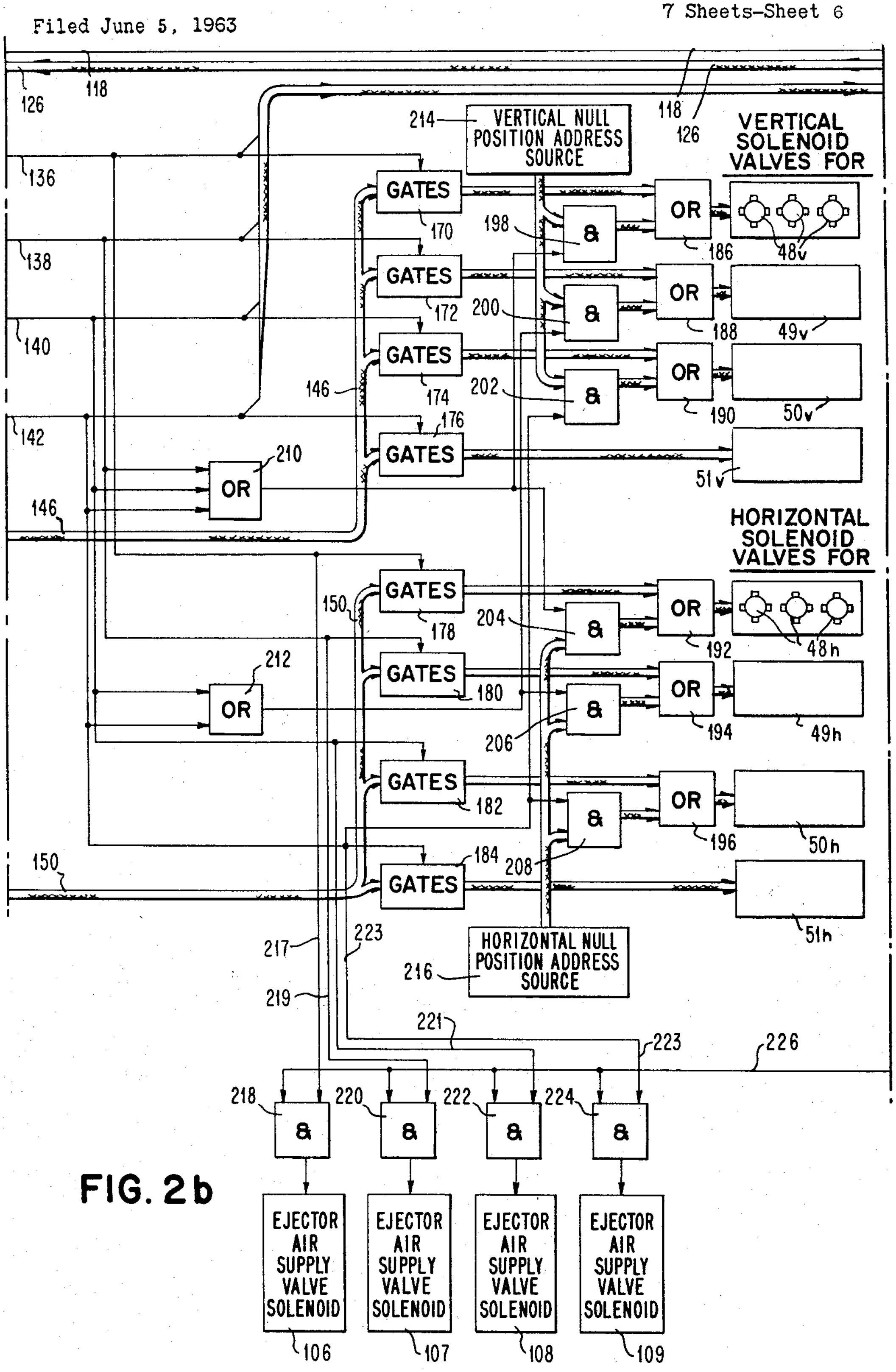

Referring now to FIGS. 2*a*–2*c*, a circuit for energizing the solenoid valves of FIGS. 1*a*–1*c* is shown. For the purpose of this discussion, it will be assumed that information as to where a desired document is stored in the storage system of FIG. 1*a* is recorded on punched cards. Input request source 110 (FIG. 2*c*) is therefore a card reader which is capable of reading the input information for one stored document and then stopping the read-out until a request is made for the information on the next desired document. An OR gate 112 applies advance signals to source 110 through line 114. One input to OR gate 112 is a start signal from manually controlled start contacts 116. The alternate input to OR gate 112 will be described later.

The signal on line 114 is also applied through line 117 to switch flip-flop 100 to its ONE state thereby energizing valve 85, and through delay 244 to reset flip-flop 230 to its ZERO state and through line 118 to condition gates 120, 122 and 124 (FIG. 2*a*). The address information contained on the punched cards is applied to 30 lines 126, four of these lines **126*a* being connected as the information inputs to the four gates 120, twelve of these lines 126*b* being connected as the information inputs to twelve gates 122, and fourteen of these lines 126*e* being connected as the information inputs to fourteen gates 124**.

The outputs from gates 120 are applied to set bin address flip-flops 128; the individual bin address flip-flops are designated **128*a* and 128*b*. Vertical first film address flip-flops 130*a*, 130*b* and 130*c* and horizontal film address flip-flops 130*d*, 130*e*, and 130*f*, are set by the outputs from gates 122. These flip-flops will be referred to as the film address flip-flops 130. The outputs from gates 124 are applied to set the document row address (i.e., the address of the film stop 28 to be raised) into flip-flops 132*a*–132*e* and to set the document column address (i.e., the position to which the lens 26**, FIG. 1*c*, is to be advanced) into flip-flops **132*f* and 132*g*. These flip-flops will be referred to as a document address flip-flops 132**.

The outputs from flip-flops 128 are applied to bin address decoder 134. This decoder is made up of four AND gates **134*a*, 134*b*, 134*c*, and 134*d*. When a document is to be taken from bin 10** (FIGS. 1*a*–1*c*) flip-flop **128*a* and 128*b* are both in their ZERO states. When a document is to be taken from bin 11, flip-flop 128*a* is in its ONE state, and 128*b* is in its ZERO state. When a document is to be taken from bin 12, flip-flop 128*b* is in its ONE state and 128*a* is in its ZERO state. When a document is to be taken from bin 13, both flip-flops are in their ONE states. The connections to the AND gates 134*a*–134*d* are such that AND gate 134*a* generates an output signal on line 136 when a document is to be taken from bin 10, AND gate 134*b* genetrates an output signal on line 138 when a document is to be taken from bin 11, AND gate 134*c* generates an output signal on line 140 when a document is to be taken from bin 12, and AND gate 134*d* generates an output signal on line 142 when a document is to be taken from bin 13**.

The outputs from the ONE side of vertical film address flip-flops **130*a*–130*c* are applied through cable 146 to the information inputs of three-gate groups 170–176**, (FIG. 2*b*). The outputs from the ONE sides of horizontal film adress flip-flops **130*e*–130*f* are applied through cable 150 to the information inputs of three-gate groups 178–184. The output signals from flip-flops 132*a*–132*e* are applied to stop-position decoder 152. This decoder is a bank of AND gates similar to the decoder 134, the only difference being that this decoder has 32 AND gates, each gate of which has five inputs, one from each of the flip-flops 132*a*–132*e*, applied to it. This decoder converts signals on five of its ten input lines into a signal on one of 32 output lines 154. Each line 154 is connected to the solenoid of a solenoid valve 30** (also see FIG. 1*a*) to cause the corresponding stop 28 to be raised. The outputs from the ONE side of flip-flops **132*f* and 132*g* are applied directly to the solenoids of solenoid valves 63. These valves determine the position of piston adder 57 and therefore, the position of the lens 26** (FIG. 1*c*).

Output lines 136, 138, and 140 of bin address decoder 134 are connected to the ONE side inputs of flip-flops 160, 162, and 164, respectively. The ONE-side output from these flip-flops are connected to the solenoids of solenoid valve 59, 60, and 61 (also see FIG. 1*a*), respectively. Therefore, when one of these flip-flops is in its ONE state, the corresponding ejectors 32, 34 or 36 (FIGS. 1*a* and 1*b*) is positioned in line with transport path 16. The output line 142 of decoder 134 is connected as one input to an OR gate 166, as one input to an OR gate 168, and directly to the ZERO side input of flip-flop 164. Line 140 is also connected to the other input of OR gate 168 and as a second input to OR gate 166. The third input to OR gate 166 is derived from line 138. The output from OR gate 166 is connected to the ZERO-side input of flip-flop 160 while the output from the OR gate 168 is connected to the ZERO-side input of flip-flop 162. From the above, it is seen that, when a document is selected from bin 13 (FIGS. 1*a*–1*c*), transport paths 18, 20, and 22 are positioned in line with transport path 16; when a document is selected from bin 12, transport paths 18 and 20 are positioned in line with transport path 16, and, when a document is selected from bin 11, transport path 18 is positioned in line with transport path 16.

Decoder output lines 136, 138, 140 and 142 are also connected as the conditioning inputs to gates 170, 172, 174 and 176 (FIG. 2*b*), respectively. These lines are also connected as the conditioning inputs to gates 178, 180, 182, and 184, respectively. The information inputs to these gates on lines 146 and 150 have already been described.

The outputs from gates 170, 172, and 174 are applied as one input to three-OR-gate banks 186, 188, and 190, respectively. The outputs from gates 176 are connected directly to the solenoids of solenoid valves 51*v* (also see FIG. 1*a*) for bin 13. The outputs from gates 178, 180, and 182 are connected as one input to three-OR-gate banks 192, 194, and 196, respectively. The outputs from gates 184 are connected directly to the solenoids of solenoid valves 51*h* for bin 13. The other inputs to OR gates 186, 188 and 190 are derived from the outputs of three-AND-gate banks 198, 200, and 202, respectively. The other inputs to OR gates 192, 194, and 196 are derived from the outputs of three-AND-gate banks 204, 206 and 208, respectively. The output from an OR gate 210 is connected to one input of AND gates 198 and 204. The inputs to this OR gate are the output lines 138, 140 and 142 of bin address decoder 134. The output from OR gate 212 is connected as one input to AND gates 200 and 206. The inputs to this OR gate are the decoder output lines 140 and 142. Decoder output line 142 is one input to AND gates 202 and 208. The output from a vertical null-position address source 214 is connected as the other inputs to AND gates 198, 200, and 202. Source 214 is a bank of triggers which is preset to represent the vertical address of position 14 (FIG. 1*b*) in bins 10, 11, and 12. The output from a horizontal null-position address source 216 is connected as the other inputs to AND gates 204, 206, and 208. This source is likewise a set of triggers which is preset to generate the horizontal address of position 14. The outputs from OR gates 186, 188 and 190 are applied to control the solenoids of solenoid valves 48*v*, 49*v* and 50*v*, respectively. The outputs from OR gates 192, 194 and 196 are applied to the solenoids of solenoid valves 48*h*, 49*h* and 50*h*, respectively.

The signals on output lines 136, 138, 140 and 142 of bin address decoder 134 are also applied through lines 217, 219, 221 and 223 as one input to AND gates 218, 220, 222 and 224, respectively. The other input to each of these AND gates is a line 226 which receives signals from input request source 110 each time a new address is read. A signal is applied to line 226 a fixed length of time after a signal is applied to line 126, this fixed length of time being sufficient to allow bins 10, 11, 12 and 13, lens 26, film stops 28, etc., to be properly positioned. Since the bins have further to move than any of the other elements, the time to position the bins will determine the time between the signals on lines 126 and 226. For a bin of the size used in this example, a time of less than 200 milliseconds would be quite sufficient.

The output lines from the AND gates 218, 220, 222 and 224 are connected to the energizing input of solenoid valves 106–109, respectively. The energizing of one of these valves causes air pressure to be applied to the associated ejectors 32–38 in a manner previously described.

When a selected film strip arrives at stops 28, it is detected by film-at-stop detector 65 (FIGS. 1*a* and 2*c*) causing the photomultiplier tube of this detector to generate an output signal on line 67 which is applied to shutter-controlled light source 62. This signal causes the shutter to be momentarily retracted. A contact (not shown) affixed to the shutter is closed when the shutter is retracted causing a signal to be momentarily applied to line 228 (FIG. 2*c*). This signal is applied to the ZERO side input of flip-flop 100 and to the ONE side input of flip-flop 230. This results in flip-flop 100 being switched to its ZERO state causing valve 85 (FIG. 1*a*) to be deenergized and valve 92 to be energized. Air pressure is therefore removed from nozzles 82 of transport paths 16–22 and air pressure is applied instead to nozzles 84. As will be seen later, this causes a film strip to be driven back into the bin 10, 11, 12 or 13.

The output from the ONE side of flip-flop 230 is applied to condition AND gate 232. Detector photomultiplier tubes 66*p*, 67*p*, 68*p* and 69*p* (also see FIG. 1*a*) detect when a film strip has reached bins 10, 11, 12 and 13, respectively. The outputs from these detectors are applied as one input to AND gates 234, 236, 238 and 240, respectively. The other input to these AND gates are the bin address decoder output lines 136, 138, 140 and 142, respectively. The outputs from AND gates 234–240 are applied through an OR gate 242 as the other input to AND gate 232. AND gate 232 therefore generates an output when a film strip has been returned to the bin from which it was ejected. The output from AND gate 232 is applied as the other input to OR gate 112. As was mentioned previously, the output from OR gate 112 is applied through delay 244 so reset flip-flop 230 to its ZERO state, is applied to the ONE side input of flip-flop 100 to switch this flip-flop to its ONE state, is applied through line 114 to input request source 110 to cause new data to be applied to lines 126, and is applied through line 118 to condition gates 120 (FIG. 2*a*), 122 and 124. The delay 244 is required so that a signal will remain on line 118 until after a signal has been applied to lines 126. If the reset time of flip-flop 230 is greater than the time required for input request source 110 to apply signals to lines 126, delay 244 is not required.

At the beginning of this section an assumption was made that input data is applied to the control circuit on punched cards. This assumption is not however an essential one and input data may be applied to the circuit on any suitable record media. If some other form of record media is used, input request source 110 would of course be a device which is capable of reading such media. The only limitation on input request source 110 is that it be capable of reading the information for a single document to be retrieved and then halting operation until a request is received on line 114 for a new document. It has also been assumed that the input request source used is capable of generating a timing pulse on line 226. If the particular source used is not capable of doing this, the box 110 may include a timing pulse generator, or the signal on line 114 may be passed through a suitable delay to line 226.

It should be noted also, that the signal on line 226 may be derived by providing for the detecting of the proper positioning of each of the elements and applying a signal to this line only when all of the elements have been properly positioned. Doing this adds greatly to the complexity of the circuit but does provide an added degree of reliability and a slightly higher speed of operation. Circuitry for deriving the signal on line 226 in the manner indicated above is shown in the beforementioned copending application Ser. No. 271,816.

*Operation*

To illustrate the operation of this system, assume that it is desired to select the document which is stored in row 31 (this is actually the 32nd row of the film strip since rows are numbered 0–31), column 3 of the film strip stored in row 7, column 7 of bin 12. This position has been marked position A in FIGS. 1*a*–1*c* and FIG. 3.

If this were the first document to be selected, the operation would begin with the closing of start contacts 116 (FIG. 2*c*); otherwise, the operation would begin with an output signal from AND gate 232. In either event, OR gate 112 generates an output signal which is applied through delay 244 to reset flip-flop 230 to its ZERO state, to the ONE side input of flip-flop 100 to cause air to flow in a direction to drive film strips from left to right in transport paths 16–22 (FIGS. 1*a*–1*b*) [i.e., to energize valve 85 causing air to flow through air tubes 86 and 88 and manifold 90 (FIG. 1*c*) to nozzles 84], to line 118 to condition gates 120, 122 and 124 (FIG. 2*a*), and to input request source 110 to cause the address information for the desired document to be applied to lines 126.

For the document indicated above, flip-flop 128*a* is set to its ZERO state and 128*b* to its ONE state. All of the film address flip-flops 130 are set to their ONE state and all of the document address flip-flops 132 are set to their ONE state. Flip-flop 128*a* being in its ZERO state and 128*b* being in its ONE state causes AND gate 134*c* to be fully conditioned causing an output signal on line 140.

Since flip-flops 130*a*, 130*b*, and 130*c* are all in their ONE state, signals appear on all three of lines 146. Flip-flops 130*d*, 130*e* and 130*f* all being in their ONE state cause signals to be applied to all three lines 150. Flip-flops 132*a*–132*e* being in their ONE states cause stop position decoder 152 to generate a signal on the output line 154 connected to the solenoid of the last solenoid valve 30. This causes the last film stop of the film stops 28 (FIG. 1*a*) to be raised. Flip-flops 132*f* and 132*g* being in their ONE states cause signals to appear on both line 158. This causes both solenoid valves 63 to be energized driving piston adder 57 (FIG. 1*a*) to its fully extended position to position the lens 26 (FIG. 1*c*) over the position in read station 24 where column 3 of the film strip will be located.

The signal on bin address decoder output line 140 is applied to the ONE side input of flip-flop 164 to switch this flip-flop to its ONE state. This energizes solenoid valve 61 to extend piston 58 (FIG. 1*a*) thereby positioning ejector 36 in line with transport path 16. The signal on line 140 is also applied through OR gate 166 to switch flip-flop 160 to its ZERO state and through OR gate 168 to switch flip-flop 162 to its ZERO state. Flip-flops 160 and 162 being in their ZERO state cause transport paths 18 and 20 to be positioned in line with transport path 16.

The signal on line 140 is also applied to condition gates 174 (FIG. 2*b*) and 182 and through OR gates 210 and 212 to condition AND gates 198, 200, 204 and 206. Gates 174 being conditioned allows the address information on lines 146 to pass through these gates and OR gates 190 to the solenoids of solenoid valves 50*v*. Since there are signals on all three lines 146, all three of the valves 50*v* are energized causing piston adder 44*v* (FIG. 1*a*) to be driven to its fully extended position. Gates 182 being conditioned, allows the horizontal address information on lines 150 to be passed through these gates and through OR gates 196 to the solenoids of solenoid valves 50*h*. Again, since there are signals on all three lines 150, all three of the valves 50*h* are energized, causing piston adder 44*h* to be driven to its fully extended position. The combined action of piston adders 44*h* and 44*v* causes position A in bin 12 to be positioned in front of ejector 36.

AND gates 198 and 200 being conditioned allow the vertical null-address generated by source 214 to be passed through these gates and through OR gates 186 and 188, respectively, to the solenoids of solenoid valves 48*v* and 49*v*, respectively. AND gates 204 and 206, being conditioned, allow the horizontal null-address generated by source 216 to be passed through OR gates 192 and 194, respectively, to the solenoids of solenoid valves 48*h* and 49*h*, respectively. Assuming that the null-address (the address of the empty position 14) is the address 3—3 as shown in FIGS. 1*a*–1*c*, the two lower order valves of 48*h*, 48*v*, 49*h* and 49*v* are energized, causing piston adders 40*h*, 40*v*, 42*h* and 42*v*, respectively, to be advanced three positions from their retracted position. This positions the empty position 14 of bins 10 and 11 in line with transport path 16.

From the above, it can be seen that, at this time, looking from left to right in FIGS. 1*a*–1*c*, the following condition exists: ejector 36, position A in bin 12, transport path 20, position 14 in bin 11, transport path 18, position 14 in bin 10, and transport path 16 are all aligned. This is the alignment of elements shown in FIGS. 1*b* and 1*c*. The lens 26 (FIG. 1*c*) is positioned to read column 3 of a film strip when a film strip is applied to read station 24 and the last stop of stops 28 is raised. Flip-flop 100 is in its ONE state, causing air to flow through valve 85 (FIG. 1*a*), air lines 86 and 88, and manifolds 90, to the nozzles 82 angled from left to right in transport paths 16–20. It should be noted that air is also flowing at this time in transport path 22 but this air is not being used. Referring back ot FIG. 2*b*, a signal on bin-address-decoder output lines 140 and 221 is also being applied to condition AND gate 222. It should be noted that, at this time, the position of bin 13 is of no concern since the bin is not used when a document is being retrieved from bin position A, and bin 13 may therefore be positioned anywhere.

At this time, a timing pulse is applied to line 226. This pulse passes through conditioned AND gate 222 to energize the solenoid of solenoid valve 108. This allows air pressure to be momentarily applied to ejector 36 causing an air pressure buildup behind the film strip in position A of bin 12 which blasts it out of the storage position. As this film strip leaves bin 12, it passes into transport path 20 where the viscous drag action of the air flowing from angled nozzles 82 acts to increase its momentum. The film strip then passes through the opening 14 in bin 11 into transport path 18 where the viscous drag action of the air flowing from angled nozzles 82 gives it a second accelerating kick. The film strip therefore has sufficient momentum to pass through the opening 14 in bin 10 and into transport path 16 where it is again accelerated by the viscous drag action of the air flowing from the angled nozzles. The film strip is in this way driven up against the raised one of the stops 28. The raised stop 28, the rightmost stop in FIG. 1*a* for this example, prevents the film from moving any further to the right, and the action of the air from angled nozzles 82 of path 16 on its surfaces prevents the film strip from rebounding to the left. The film strip is in this way held in the desired position. An air brake (not shown) may be provided between read station 24 and the stops 28 to prevent the film strip from striking the raised stop 28 at a high velocity.

The arrival of the film strip at the stop 28 is detected by film-at-stop detector 65 (FIG. 2*c* and FIG. 1*a*) causing a signal to be applied via line 67 to shutter-control mechanism 62 to cause the shutter to be momentarily opened to reproduce the desired document on output film 64. The opening of the shutter closes a contact (not shown), causing a signal to be applied to line 228 to transfer flip-flop 230 to its ONE state and to transfer flip-flop 100 to its ZERO state. The transferring of flip-flop 100 to its ZERO state causes the solenoid for solenoid valve 85 to be deenergized and the solenoid for solenoid valve 92 to be energized. This causes air to be applied through valve 92, air lines 94 and 96 and manifolds 98 to nozzles 84 angled from right to left in transport paths 16–22. The viscous drag effect of the air flowing from nozzles 84 in transport path 16 on the surfaces of the film strip drives the film strip from its position up against film stop 28 to the left into the opening 14 in bin 10. The film strip passes through this opening into transport path 18 where it is given an additional kick, through the opening 14 in bin 11, into transport path 20 where it is again given an extra kick and finally into position A of bin 12 where it is stopped.

As the film strip passes through bins 10 and 11, detector photomultipliers 66*p* and 67*p* (FIGS. 1*a* and 2*c*) generate output signals. However, since AND gates 234 and 236 are not conditioned at this time, these output signals are ineffective. However, when the film strip reaches bin 12, detector photomultiplier 68*p* generates an output signal which is applied to conditioned AND gate 238 to cause an output signal to be applied through OR gate 242 to AND gate 232. AND gate 232 is conditioned at this time by the output from the ONE side of flip-flop 230 and therefore generates an output signal which is applied to OR gate 112 to start a new document-retrievel cycle.

The system operates in a manner similar to that described above to select a desired document from any of the other bins. Since the time required for a document to pass through the bins is infinitesimal, compared with the time required to move the bins for positioning purposes, the above-described system allows the document storage capacity to be doubled, tripled, quadrupled, etc., without any appreciable increase in the access time to a given document. The positioning of all the bins is accomplished at the same time so the added bins cause no appreciable increase in the access time to a desired document. It should also be noted that, with the above system, the bins do not return to the position with the piston adders fully retracted after each document is selected, but remain in their extended position until a new instruction is received, so that the average access time to a receiving position is the average access time from one random position to another random position rather than the average access time from the ZERO-row-ZERO-column position to any random position, the former figure being a much smaller one.

While in the above example, the third-row-third-column position was chosen as the null-position 14 in bins 10, 11 and 12, it is, of course, understood that any desired bin position could be used as null-position 14. As will be seen later, a plurality of open positions 14 may be provided in a bin where one is willing to sacrifice storage capacity in order to obtain a higher speed of operation or to make the techniques of the invention compatible with the system in which it is employed.

It should also be noted that, while in FIGS. 1*a*–1*c*, only a single bank of bins has been shown, it is completely within contemplation of this invention to have a second bank of bins positioned on the opposite side of read station 54, the operation of this second bank of bins in conjunction with the bank of bins shown in FIG. 1 being similar to the cooperation between the two bins which is described in the beforementioned copending application Ser. No. 271,816. It is also within the contemplation of this invention to have a plurality of banks of bins arranged in a circular array around a central read station with means being provided to access the bank of bins in which a desired document is stored.

Figure 4:
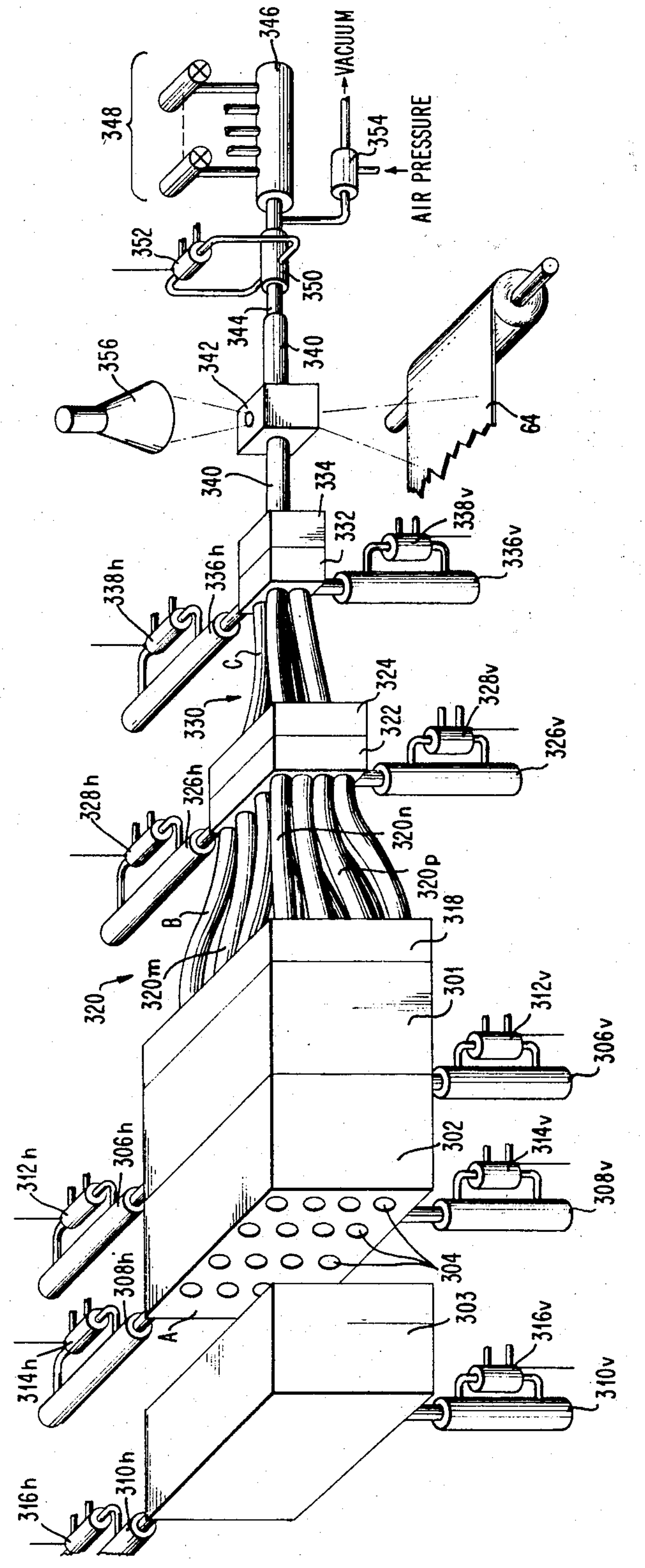
FIG. 4 is a partially exploded perspective view of a second embodiment of the storage and transport system of this invention.

*General description FIGURE 4*

FIG. 4 shows a document transport and retrieval system which is identical to that shown in FIG. 1 of the beforementioned copending application Ser. No. 281,594 except that there are three bins 301, 302 and 303, in close physical contact with each other, rather than just one bin as shown in the copending application, and each of the forward bins 301 and 302 has an opening 304 formed through it at every fourth record receiving position. The openings 304 in bin 301 are normally positioned in front of the openings 304 shown in bin 302. Each bin has sixty-four record-receiving positions. These positions are tube-like openings in the bins the diameters of which were substantially equal to the diameter of a head (not shown) affixed to each document bearing film strip. Details of the receiving positions and the film strip assembly are shown in the above-mentioned copending application.

Bins 301–303 are moved one position in the horizontal direction by pneumatic cylinders 306*h*, 308*h* and 310*h*, respectively, and one position in the vertical direction by a pneumatic cylinder 306*v*, 308*v*, and 310*v*, respectively. Each of the horizontal cylinders is normally in its retracted position with air pressure applied to its upper input line and atmospheric pressure applied to its lower input line and is moved to its extended position by energizing a four-way valve 312*h*, 314*h* or 316*h*, respectively, to cause air pressure to be applied to its lower input line. Each of the vertical cylinders is likewise normally in its retracted position and is moved to its extended position by transferring a four-way valve 312*v*, 314*v* or 316*v*, respectively, to cause air pressure to be applied to its lower input line.

The remainder of the system shown in FIG. 4 is identical to, and functions in the identical manner, to the system shown in FIG. 1 of the beforementioned copending application Ser. No. 281,594. A matrix plate 318 is in close physical contact with the front face of bin 301, but is not attached thereto. Sixteen air tubes 320 come out of the front of plate 318, the tubes 320 being positioned in front of the openings 304 in bin 301 when cylinders 306*h* and 306*v* are in their retracted positions. Tubes 320 are applied to one side of the matrix plate 322, the other side of this plate being in close physical contact with, but not being connected to, matrix plate 324. Matrix plate 322 is moved one position in the horizontal or the vertical plane by pneumatic cylinders 326*h* or 326*v*, respectively. The position of these cylinders is controlled by four-way valves 328*h* and 328*v*, respectively.

Matrix plate 324 has four air tubes 330 coming out from its front, these tubes being positioned, when cylinders 326*h* and 326*v* are retracted, in front of the upper right hand air tube of each of the four tube matrices which can be formed from the tubes 320 [i.e., in front of tubes 320*m*, 320*n*, 320*o* (not shown) and 320*p*]. Therefore, by extending pneumatic cylinders 326*h* and 326*v* either singularly or in combination, a tube 330 may be positioned in front of any one of the tubes 320. The four tubes 330 feed into the back of a matrix plate 332, the front of this plate being in close physical contact with, but not connected to, a matrix plate 334. The matrix plate 332 may be moved one position in the horizontal or the vertical plane by switching air pressure to the lower input lines of cylinders 336*h* or 336*v*, respectively, under control of four-way valves 338*h* and 338*v*. Plate 334 has a single air tube 340 coming out from its front face. The tube 340 is positioned in front of the upper right hand one of the tubes 330 when pneumatic cylinders 336*h* and 336*v* are in their retracted positions.

The tube 340 passes through an optical-read station 342 to a movable stopping member 344. Member 344 is moved in tube 340 by piston adder 346 under control of valves 348. The position of member 344 in tube 340 determines which document on the film strip is at read station 342 when the film strip is stopped. If the film strip has rotated during its passage through the tubes so as to be improperly oriented when it reaches stop member 344, it is rotated to bring it into proper orientation by rotation member 350 under control of four-way valve 352. Details of the rotation member and of the other elements mentioned in this section are given in the beforementioned copending application Ser. No. 281,594. Air pressure or vacuum is applied to the system through valve 354 stop member 344 and tube 340. Valve 354 ordinarily causes air pressure to be applied to the system, but, when its solenoid is energized, causes vacuum to be applied to the system. Optical-read station 342 is identical to optical-read station 24 (FIG. 1*a*) previously described, except that its lens is fixed rather than movable. Light is applied to optical-read station 342 by light source 356 under control of electric control circuitry (not shown). The image containing light beam passing out of optical-read station 342 is applied to output film 64.

*Operation of embodiment shown in FIG. 4*

Most of the control circuitry for the system shown in FIG. 4 is shown and described in the beforementioned copending application Ser. No. 281,594. The additional control circuitry required to properly position bins 301–303 is similar to that shown in FIGS. 2*a*–2*c*, the principle differences being (a) since there are no ejector or transport paths between the bins, all the circuitry for positioning these elements can be eliminated and (b) since the null positions for the forward bins is the position with both of their pneumatic cylinders retracted, only the bin containing the requested document need be positioned. For this reason, only a description of the mechanical operation of the system shown in FIG. 4 will be given.

Assume that it is desired to retrieve a document stored on a record strip which is itself stored in the document receiving position of bin 302 in front of point A. To retrieve this document, transfer signals are applied to four-way valves 314*h*, 314*v*, 328*h* and 338*h*. This causes pneumatic cylinders 308*h*, 308*v*, 326*h* and 336*h* to be driven to their extended position. Since bin 301 has openings 304 in it at the same bin address as bin 302, the movement of bin 302 one position up and one position to the right resulting from the energizing of valves 314*h* and 314*v*, causes the record receiving position in front of point A to be positioned in line with the upper left hand opening in bin 301 and therefore with air tube B of the tubes 320. The movements of plates 322 and 332 one position to the right resulting from the energizing of valves 328*h* and 338*h*, respectively, cause the air tube B to be aligned with the air tube C of air tubes 330 and the air tube C to be aligned with air tube 340.

When the system is aligned as indicated above, (it being assumed that stop member 344 has been properly positioned by piston adder 346), the control circuit causes valve 354 to apply vacuum to the system. This draws the record containing the requested document from its record receiving position in bin 302 through the upper leftmost opening 304 in bin 301, through plate 318 and tube B of the tubes 320, through plates 322 and 324, through tube C of the tubes 330, through plates 332 and 334, and through tube 340 to be stopped by stop member 344.

After the film strip containing the requested document has been properly positioned at optical-read station 342, light source 356 is operated by control circuitry (not shown) to cause the requested document to be reproduced on output film 64. When the utilization of the document has been completed, a signal is generated in the control circuitry which causes valve 354 to be de-energized allowing air pressure to be reapplied to the system through stop member 344 and tube 340. This air pressure drives the film strip at the optical-read station through tube 340, through matrix plates 334 and 332, through tube C of tubes 330, through matrix plates 324 and 322, through tube B of tubes 320, through matrix plate 318 and through the upper left opening 304 in bin 301 to the record receiving position in front of point A in bin 302. The system is now ready to position another film strip to be selected.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A record retrieval system comprising:
a utilization device;
first and second bins each having a plurality of record receiving positions, said first bin being positioned between said utilization device and said second bin, and said first bin having an opening formed therethrough at at least one of its record receiving positions;
means for selectively requesting records;
means responsive to a request for a record from said second bin for causing said bins to be positioned to align the record receiving position in said second bin containing the requested record with an opening in said first bin,
and means for transporting the requested record through the aligned opening in said first bin to said utilization device.

2. A record retrieval system comprising:
a utilization device;
a plurality of bins each having a plurality of record receiving positions, said bins being positioned in line one behind the other with the utilization device in front of the frontmost bin, and with each bin having a bin behind it, having an opening therethrough at at least one of its record receiving positions;
means for selectively requesting records;
means responsive to a request for a record from a given bin for causing said given bin and all the bins in front of it to be positioned to align the record receiving position in said given bin containing the requested record with an opening in each of the bins in front of it;
and means for transporting the requested record through the aligned openings in said forward bins to said utilization device.

3. A system for retrieving a requested document comprising:
a first bin in which a plurality of document-containing records are stored, said bin having an opening therein large enough for a record to pass through;
a document utilization station;
means positioned in front of said first bin for transporting a record to said document utilization station;
a second record-containing bin positioned behind said first bin;
a transport path connecting said first and second bins;
means responsive to a request for a document stored on a record in said second bin for aligning said record, said transport path, the opening in said first bin, and said transporting means;
and means for ejecting the record containing the requested document from the bin in which it is stored to said transporting means.

4. The system of claim 3 including:
means for indicating the relative position of the requested document on its record;
and means responsive to said indicating means for causing said record to be stopped in said transporting means with the requested document at said utilization station.

5. A system for retrieving a requested document comprising:
a plurality of bins positioned one behind the other, each of said bins having a plurality of document-containing records stored therein, and each bin having a bin behind it having an opening large enough for a record to pass through;
a document utilization station;
means positioned in front of said bins for transporting a record to said document utilization station;
a transport path connecting each of said bins with the bin in front of it;
means responsive to a request for a document stored on a record in a given bin for aligning said record, all the transport paths in front of said given bin, the openings in all the bins in front of said given bin, and said transporting means;
and means for ejecting the record containing the requested document from the bin in which it is stored to said transporting means.

6. A record retrieval system comprising:
a utilization device;
first and second bins each having a plurality of record receiving positions therein, said bins being positioned flush against each other with said first bin between said utilization device and said second bin, and said first bin having an opening formed therethrough at at least one of its record receiving positions;
means responsive to a request for a record from said second bin for causing said bins to be positioned to align the record receiving position in said second bin containing the requested record with an opening in said first bin;
and means for causing the requested record to be passed through the aligned opening in said first bin to said utilization device.

7. A record retrieval system comprising:
a utilization device;
first and second bins each having a plurality of record receiving positions; said bins being positioned flush against each other with said first bin between said utilization device and said second bin, and said first bin having an opening formed therethrough at every fourth one of its record receiving positions;
means responsive to a request for a record from said second bin for causing said second bin to be positioned to align the record receiving position in said second bin containing the requested record with the associated one of the openings in said first bin;
and vacuum means for drawing the requested record from its receiving position in said second bin, through the associated opening in said first bin to said utilization device.

8. A record retrieval system comprising:
a utilization device;
a plurality of bins each having a plurality of record receiving positions formed therein, said bins being positioned in a line one behind the other and flush against each other with the utilization device in front of the frontmost bin, and with each bin having a bin behind it having an opening formed therethrough at at least one of its record receiving positions;
means responsive to a request for a record from a given bin for causing said given bin and all the bins in front of it to be positioned to align the record receiving position in said given bin containing the requested record with an opening in each of the bins in front of it;
and means for causing the requested record to be passed through the aligned openings in said forward bins to said utilization device.

9. A record retrieval system comprising:
a utilization device;
first and second bins each having a plurality of record receiving positions; said first bin being positioned between said utilization device and said second bin, and said first bin having an opening formed therethrough at one of its record receiving positions;
first transport means connecting said first bin to said utilization device;
second transport means connecting said first and second bins, said second transport means being normally aligned with said first transport means;
first ejector means positioned behind said second bin in line with said first transport means;
second ejector means positioned behind said first bin adjacent said second transport means;
means responsive to a request for a record from said second bin for positioning said bins with the record receiving position in said second bin containing the requested record and the opening in said first bin in line with said first and second transport means and said first ejector means;
means responsive to a request for a record from said first bin for positioning said first bin with the record receiving position containing the requested record in line with said first transport means and for repositioning said second transport and ejector means so that said second ejector rather than said second transport means is in line with said first transport means;
and means operable when said bins are properly positioned for energizing the ejector means positioned behind the bin containing the requested record.

10. A system for retrieving a requested document stored as one of a plurality of documents on a document containing record strip comprising:
a utilization device;
first and second bins each having a plurality of record receiving positions formed therein, said first bin being positioned between said utilization device and said second bin, and said first bin having an opening formed therethrough at one of its record receiving positions;
first transport means connecting said first bin to said utilization device;
second transport means connecting said first and second bins, said second transport means being normally aligned with said first transport means;
first ejector means positioned behind said second bin in line with said first transport means;
second ejector means positioned behind said first bin adjacent said second transport means;
means responsive to a request for a document stored on a record in said second bin for positioning said bins with the record receiving position in said second bin containing the requested-document-containing record and the opening in said first bin in line with said first and second transport means and said first ejector means;
means responsive to a request for a document stored on a record in said first bin for positioning said first bin with the record receiving position containing the requested-document-containing record in line with said first transport means and for repositioning said second transport and ejector means so that said second ejector rather than said second transport means is in line with said first transport means;
means operable when said bins are properly positioned for energizing the ejector means positioned behind the bin containing the requested-document-containing record;
means for indicating the relative position of said requested document on its record strip;
and means responsive to said indicating means for stopping the ejected record in said first transport means with the requested document at said utilization device, 11. An element retrieval system comprising:
a utilization device;
first and second bins each having a plurality of element receiving positions formed in the front face thereof, said first bin being positioned between said utilization device and said second bin, and said first bin having an opening formed therethrough at at least one of its record receiving positions;
means for moving each of said bins in a first direction in the plane of said front face;
means for moving each of said bins in a second direction in the plane of said front face;
means responsive to a request for an element stored in said second bin for energizing said bin moving means to position the element receiving position containing the desired element in line with an opening in said first bin;
and means for transporting the requested record through the aligned opening in said first bin to said first utilization device.

12. An element retrieval system comprising:
a utilization device;
first and second bins each having a plurality of element receiving positions formed in the front face thereof, said first bin being positioned between said utilization device and said second bin, and said first bin having an opening formed therethrough at at least one of its record receiving positions;
means for transporting an element from said first bin to said utilization device;
means for moving said first bin in a first direction in the plane of said front face;
means for moving said first bin in a second direction in the plane of said front face;
means for moving said second bin in said first direction;
means for moving said second bin in said second direction;
means responsive to a request for an element from said first bin for energizing said first bin moving means to position the element receiving position containing the desired element in line with said transport means;

means responsive to a request for an element stored in said second bin for energizing the first bin moving means to position an opening in said first bin in line with said transport means and for energizing said second bin moving means to position the element receiving position containing the desired element in line with the opening in said first bin and the element transport means;

and means for transporting the requested element through the aligned opening and said transport path to said utilization device.

13. An element retrievel system comprising:

a utilization device;

a plurality of bins each having a plurality of record receiving positions formed in the front face thereof, said bins being positioned in line one behind the other with the utilization device in front of the frontmost bin, and with each bin having a bin behind it having an opening therethrough at at least one of its element receiving positions;

means for moving each of said bins in a first direction in the plane of said front face;

means for moving each of said bins in a second direction in the plane of said front face;

means responsive to a request for an element from a given bin for energizing said bin moving means to align the element receiving position containing the requested element with an opening in each of the bins in front of the bin containing the requested element;

and means for transporting the requested element through the aligned openings in said forward bins to said utilization device.

14. An element retrieval system comprising:

a utilization device;

a plurality of bins each having a plurality of element receiving positions formed in the front face thereof, said bins being positioned in line one behind the other with the utilization device in front of the frontmost bin, and with each bin having a bin behind it having an opening therethrough at at least one of its record receiving positions;

means for transporting an element from the frontmost bin to said utilization device;

individual means for moving each of said bins in a first direction in the plane of said front face;

individual means for moving each of said bins in a second direction in the plane of said front face;

means responsive to a request for an element in a given bin for energizing the bin moving means for each of the bins in front of said given bin to position an opening in its bin in line with said transport means and for energizing the bin moving means for said given bin to position the element receiving position containing the requested element with the aligned openings in the forward bins and said transport means;

and means for transporting the requested element through the aligned openings in said forward bins and said transport means to said utilization device.

15. An element retrieval system comprising:

a utilization device;

a plurality of bins each having a plurality of element receiving positions formed in the front face thereof, said bins being positioned in line one behind the other with the utilization device in front of the frontmost bin, and with each bin having a bin behind it having an opening therethrough at at least one of its record receiving positions;

at least one means for transporting an element from the frontmost bin to said utilization device;

individual means for moving each of said bins in a first direction in the plane of said front face;

individual means for moving each of said bins in a second direction in the plane of said front face;

means responsive to a request for an element in a given bin for energizing the bin moving means for each of the bins in front of said given bin to position an opening in its bin in line with a selected one of said transport means and for energizing the bin moving means for said given bin to position the element receiving position containing the requested element with the aligned openings in the forward bins and said selected transport means;

and means for transporting the requested element through the aligned openings in said forward bins and said selected transport means to said utilization device.

No references cited.

DARYL W. COOK, *Primary Examiner.*